(12) United States Patent
Ukonaho et al.

(10) Patent No.: US 7,414,834 B2
(45) Date of Patent: Aug. 19, 2008

(54) MOBILE COMMUNICATIONS DEVICE WITH SYNCHRONISING HINGE

(75) Inventors: Mikko Ukonaho, Nokia (FI); Esa-Sakari Maatta, Viiala (FI); Ilpo Kauhaniemi, Vantaa (FI); Sami Myyrylainen, Espoo (FI)

(73) Assignee: Nokia Corporation, Espoo (FI)

( * ) Notice: Subject to any disclaimer, the term of this patent is extended or adjusted under 35 U.S.C. 154(b) by 287 days.

(21) Appl. No.: 11/354,258

(22) Filed: Feb. 14, 2006

(65) Prior Publication Data

US 2006/0238970 A1 Oct. 26, 2006

Related U.S. Application Data

(63) Continuation-in-part of application No. 11/111,485, filed on Apr. 21, 2005.

(51) Int. Cl.
*H05K 7/16* (2006.01)
(52) U.S. Cl. .............................. 361/683; 16/366; 16/354
(58) Field of Classification Search ... 455/575.1–575.4, 455/90.3, 90.1, 88, 553.1, 73, 89; 361/679, 361/681, 759, 756, 755, 747, 740, 732, 683; 16/330, 303, 354, 366, 368; 379/433.13; 248/913–924
See application file for complete search history.

(56) References Cited

U.S. PATENT DOCUMENTS

| | | | |
|---|---|---|---|
| 4,825,395 A | | 4/1989 | Kinser, Jr. et al. |
| 5,363,089 A | * | 11/1994 | Goldenberg ................ 340/7.63 |
| 5,494,447 A | | 2/1996 | Zaidan |
| 5,666,694 A | | 9/1997 | Slow et al. |
| 5,983,073 A | | 11/1999 | Ditzik |
| 5,987,704 A | | 11/1999 | Tang ............................ 16/354 |
| 6,009,568 A | * | 1/2000 | Miyazaki ........................ 4/236 |
| 6,191,937 B1 | * | 2/2001 | Bang ........................... 361/681 |
| 6,259,897 B1 | | 7/2001 | Kim |
| 6,304,431 B1 | | 10/2001 | Kim |
| 6,344,977 B1 | * | 2/2002 | Takagi ........................ 361/814 |
| 6,374,089 B1 | * | 4/2002 | Till ............................. 455/90.1 |
| 6,445,574 B1 | | 9/2002 | Saw et al. |
| 6,456,487 B1 | | 9/2002 | Hetterick |
| 6,459,887 B2 | * | 10/2002 | Okuda ........................ 455/90.1 |
| 6,493,216 B1 | | 12/2002 | Lin ............................. 361/681 |

(Continued)

FOREIGN PATENT DOCUMENTS

JP 2003-309756 10/2003

(Continued)

*Primary Examiner*—Lisa Lea-Edmonds
*Assistant Examiner*—Ingrid Wright
(74) *Attorney, Agent, or Firm*—Perman & Green, LLP (57) ABSTRACT

The invention relates to a mobile communications device comprising a housing, a transceiver in the housing, a keypad connected to the housing, and a display connected to the housing, wherein the housing comprises a first section movably connected to a second section of the housing by a multi-axis hinge, wherein a first axis of rotation of the hinge is provided at the first section of the housing and a second offset axis of rotation of the hinge is provided at the second section of the housing, and wherein the hinge comprises means for synchronizing rotation of the first and second sections relative to the hinge through a path of about 360 degrees. The invention further relates to a hinge for use therein.

29 Claims, 6 Drawing Sheets

U.S. PATENT DOCUMENTS

| | | |
|---|---|---|
| 6,519,141 B2 | 2/2003 | Tseng et al. |
| 6,519,812 B2 | 2/2003 | Ko et al. ............... 16/354 |
| 6,574,837 B2 | 6/2003 | Jantschek |
| 6,708,046 B1 | 3/2004 | Takagi |
| 6,785,935 B2 | 9/2004 | Ahn et al. |
| 6,788,527 B2 | 9/2004 | Doczy et al. |
| 6,885,849 B1 * | 4/2005 | Kim et al. ............ 455/90.3 |
| 6,900,981 B2 | 5/2005 | Kuivas et al. |
| 6,925,684 B2 | 8/2005 | Kang et al. |
| 7,140,074 B2 * | 11/2006 | Han et al. ............. 16/366 |
| 2002/0154475 A1 | 10/2002 | Lammintaus et al. ..... 361/683 |
| 2003/0172495 A1 | 9/2003 | Pan ..................... 16/292 |
| 2004/0064919 A1 | 4/2004 | Lu |
| 2004/0080667 A1 | 4/2004 | Jeong et al. |
| 2004/0203535 A1 | 10/2004 | Kim et al. |
| 2004/0207568 A1 | 10/2004 | Ooshima et al. |
| 2005/0050686 A1 | 3/2005 | Kurokawa ............. 16/354 |
| 2005/0155182 A1 | 7/2005 | Han et al. ............. 16/336 |
| 2005/0155184 A1 | 7/2005 | Kayl |

FOREIGN PATENT DOCUMENTS

| | | |
|---|---|---|
| JP | 2002-171324 | 4/2008 |
| KR | 2002-0033239 | 5/2002 |
| WO | 2004/095808 A2 | 11/2004 |

* cited by examiner

MOBILE COMMUNICATIONS DEVICE WITH SYNCHRONISING HINGE

CROSS-REFERENCE TO RELATED APPLICATIONS

This application is a continuation-in-part of U.S. patent application Ser. No. 11/111,485 filed on Apr. 21, 2005 which claims priority from U.S. patent application Ser. No. 10/829,415 filed on Apr. 21, 2004, now U.S. Pat. No. 7,155,266, issued on Dec. 26, 2006; and U.S. patent application Ser. No. 10/421,278 filed Apr. 23, 2003, now U.S. Pat. No. 6,900,981, issued May 31, 2005, the disclosures of which are incorporated herein by reference in their entirety.

FIELD OF INVENTION

The invention relates to a mobile communications device, and more particularly to foldable mobile communications device and a hinge for use therein.

TECHNICAL BACKGROUND

U.S. Patent Publication No. US 2002/0154475 A1 discloses a folding electronic device. The device has a first part with a keyboard and a second part with a display. The second part is connected to the first part by a two-joint mechanical hinge. The second part can be moved between a first position against a first side of the first part and a second position against an opposite second side of the first part.

Fold mobile phones, also known as a flip phone or a clamshell phone, are becoming more and more popular in today's mobile telephone market, especially in Asia. In normal fold mobile phones, the phones have a lid with a display which pivots about 160-180 degrees relative to the portion of the telephone having the keypad. The fold phone has two positions of the lid; either a closed position or an open position.

There is a desire for a new type of reconfigurable mobile telephone which can be configured similar to a conventional flip phone, and which also can be reconfigured with the lid pivoted more than 180 degrees, such as 360 degrees. However, for such a multi-open position fold mobile telephone, there is a desire to provide a robust and compact design which can provide a smooth opening and closing motion for the user. This type of motion will prevent the user from erroneously perceiving the mobile telephone as having a flimsy construction (which might be perceived from a flip phone which opens and closes too easily or with a hinge that does not move in a consistent repetitive fashion).

The Japanese patent document JP2003-309756 discloses a foldable mobile telephone, wherein a display portion is pivotable 180 degrees around a first axis relative a keyboard portion. The display portion is moreover pivotable 90 degrees around a second axis perpendicular to the first axis. A user of the mobile telephone may hence more freely turn the display portion to a desired direction. However, the structure of the hinge according to JP 2003-309756 does not allow a 360 degree folding of the two portions forming the mobile telephone.

US 2003/0172495 A1 discloses a flip phone having a hinge mechanism with an auto-lock function. The flip phone includes a main body and a flipper connected by means of the hinge. The hinge is arranged to rotatably connect the flipper to the main body so as to provide an opened position or a closed position for the flipper. In the open position, the flipper is positioned at an angle approximately 160 degrees relative the main body.

SUMMARY OF INVENTION

In accordance with one aspect of the invention a hinge is provided. The hinge comprises a hinge frame, a first hinge member defining a first axis of rotation with a first element connected to the hinge frame, a second hinge member defining an offset second axis of rotation with a second element connected to the hinge frame, and synchronizing members which transfer rotational movement of the first element relative to the hinge frame to rotational movement of the second element relative to the hinge frame through a path of about 360 degrees of rotational movement of the first element in relation to the second element, wherein the hinge further comprises a locking mechanism for locking the position of the second element relative to the first element comprising a first locking member being non-rotatably connected to the first hinge member and provided with one or more indentations or protuberances positioned at predetermined angular positions in relation to the first axis of rotation, a second locking member being non-rotatably connected to the second hinge member and provided with one or more indentations or protuberances positioned at predetermined angular positions in relation to the second axis of rotation, and a third locking member being non-rotatably connected to the hinge frame and on one hand provided with one or more protuberances or indentations positioned at predetermined angular positions in relation to the first axis of rotation and on the other hand provided with one or more protuberances or indentations positioned at predetermined angular positions in relation to the second axis of rotation, wherein the third locking member is biased against the first and second locking members.

When the user of the mobile communications device being provided with the hinge moves the two elements towards or away from each other the synchronizing members will force the rotation of the first element in relation to the hinge to be synchronized with the rotation of the second element in relation to the hinge. It is contemplated that in most embodiments the desired synchronization will force the two elements to rotate the same amount but in opposite directions in relation to the hinge. The result is that the relative rotation between the two elements connected to the hinge is divided into two equal rotations; one half being the rotation of the first element relative to the hinge and the second half being the rotation of the second element relative to the hinge. Thus when a user opens the two elements of the mobile communications device, each of the two elements will experience a rotation in relation to the hinge being half the rotation experienced between the two elements. Due to the synchronized movements of the first and second elements, the two elements will fold and unfold smoothly without the risk of jamming the hinge, i.e. the case where one element unfolds in relation to the hinge while the second element remains immovable relative to the hinge. The second element of the hinge is adapted to rotate about 360 degrees relative to the first element of the hinge. Since the hinge comprises a locking mechanism for locking the position of the second section relative to the first section a user may unfold the device to specific, predetermined positions for e.g. viewing a screen on the device or when answering the phone using the phone in elongated position where the first and second sections are essentially in line with each other.

Since the locking mechanism comprises a first locking member being non-rotatably connected to the first hinge member and provided with one or more indentations or protuberances positioned at predetermined angular positions in relation to the first axis of rotation, a second locking member being non-rotatably connected to the second hinge member and provided with one or more indentations or protuberances positioned at predetermined angular positions in relation to the second axis of rotation, and a third locking member being non-rotatably connected to the hinge frame and on one hand provided with one or more protuberances or indentations positioned at predetermined angular positions in relation to the first axis of rotation and on the other hand provided with one or more protuberances or indentations positioned at predetermined angular positions in relation to the second axis of rotation, wherein the third locking member is biased against the first and second locking members, a locking mechanism providing great stability is achieved. The user will experience that the sections will have a distinct locking functionality in relation both to each other and in relation to the hinge frame. With this design the user will experience a number of distinct positions where the hinge will be experienced as a fixed and stable unit. By introducing a number of indentations or protuberances at different angular positions it is possible to for the hinge to be locked into a number of different positions. Preferably the locking positions provided by the indentations and protuberances about the first axis of rotation coincides with the locking positions provided by the indentations and protuberances about the second axis of rotation. However, the basic design allows that the locking positions of the first and second locking member differ, which may suitable to use when the mobile communications device is to be provided with a plurality of locking positions. Each of the first and second locking members may then provide every second locking position.

The hinge body may be adapted to maintain a fixed offset distance between the first and second axes of rotation.

The hinge may be arranged in a mobile communications device comprising a first and a second section, wherein the first section of the mobile communications device comprises the first element of the hinge and the second section of the mobile communications device comprises the second element of the hinge.

The first and second elements of the hinge may be frame members rigidly attached or attachable to a first and second section of a mobile communications device. This way the hinge may be formed as a separate unit which fixed or detachably carry the first and second sections of a mobile communications device.

The hinge has preferably a thickness smaller than the thickness of the first and second section. With a hinge having a thickness smaller than the first and second section the hinge will be within the outer perimeter of the sections. This way the user will not experience that the hinge is inconveniently large. A hinge will e.g. be considered inconveniently large if it interferes with flat-laying of a mobile communications device on a table, or if it extends past the outer perimeter of a mobile communications device being closed for storage in a pocket or the like. It will also be considered inconveniently large if it get entangled with straps for other electronic devices, the headset of the mobile communications device or a string of a hood or the like on a jacket. The designs disclosed in more detail below make it possible to form a hinge with a thickness (in a direction being perpendicular both to a line extending between the first and second axis of rotation and to the first and second axis of rotation) being smaller than the distance between the first and the second axis of rotation. The designs disclosed in more detail below also makes it possible to form a hinge having a thickness (in a direction along the distance between the first and second axis of rotation) being smaller than twice the distance between the first and second axis of rotation. Dependent upon the kind of mobile communications device different aspects of being thin may be contemplated.

The hinge may comprise a hinge frame having a generally oval side profile and two parallel pin receiving holes. The thickness of the hinge may hence be reduced providing a slender but still durable hinge. As briefly mentioned above a slender design will minimize the risk that the mobile communications device get stuck in the pocket or get entangled with straps for other electronic devices, the headset of the mobile communications device or a string of a hood or the like on a jacket.

It is also contemplated that the hinge may comprise a hinge frame having a generally rectangular shape. This may e.g. be convenient when it is desired to provide a mobile communications device with stable stand up properties.

The hinge frame may be adapted to receive and substantially enclose the synchronizing and locking members, preferably by comprising a recess for receiving at least the synchronizing members. The synchronizing and locking members will then be protected from dust which could imperil the function of the hinge.

The hinge may comprise a hinge lock for locking the position of the second section relative to the first section at an intermediate position between a fully closed position and a 360 degree fully open position. A user of a device equipped with a hinge according to the present invention may hence unfold the device to specific, predetermined positions for e.g. viewing a screen on the device.

In accordance with an aspect of the inventive hinge it further comprises a flex circuit extending across the hinge being adapted to electrically connecting electronic circuitry in a first section attached to the first hinge member to electronic circuitry in a second section attached to the second hinge member. With this flex circuit it is possible to electrically connect the electronic circuitry in the first section to electronic circuitry in the second section and still allowing the two sections to be folded about each other in a complete path of 360° in relation to each other.

The flex circuit may be partly wound about the first axis of rotation in a first direction and about the second axis of rotation also in the first direction. With this design the flex circuit will act as a belt being wound about the first and second axis of rotation such that it will be fully or partly transferred from one of the axis of rotation to the other as the hinge members are rotated.

The flex circuit may be wound about the first and second axis of rotation in a total winding angle of at least 180°. With this design there will always be enough circuit to allow a total mutual rotation of 360° of the hinge members and the axes of rotation. When the first axis rotates 180° and wound off 180° flex circuit, the second axis will rotate 180° and wound up the corresponding amount of flex circuit, thus allowing a total of 360° mutual rotation of the hinge members.

The third locking member may be movable along the first and second axis of rotation thereby allowing said indentations and protuberances of the third locking member to engage and disengage said indentations and protuberances of the first and second locking members. This way a distinct locking functionality is achieved. Moreover, the design make it possible to use the inside of the hinge frame or the axes of rotation to give a stable guiding of the third locking member. Moreover, the moveability makes it easy to provide the biasing simply by providing a pressure spring, such as a coiled spring, between the third locking member and a shoulder or wall of the hinge frame.

The third locking member may comprise a body formed with two through-going holes and wherein two shafts, extending along the first and second axis of rotation, respectively, extends through said through-going holes. This makes it possible to use the axis of rotation as guides when the third locking member is displaced for accomplishing the engagement and disengagement.

Each of the first and the second locking members may comprise a disc non-rotatably attached to the hinge member as a wheel about the respective axis of rotation and provided with indentation on a side surface. This way it is easily accomplished locking positions through-out the maximum rotation of the first and second hinge members. Moreover, the increased radius will give an increased torque resistance of the locking mechanism.

In accordance with an aspect of the inventive hinge the synchronizing members comprises a first gear rotatable with first hinge member about an third axis of rotation offset the first axis of rotation, a second gear rotatable with the second hinge member about a fourth axis of rotation offset the second axis of rotation and in engagement with the first gear, and a first intermediate member connecting the first hinge member with the first gear and a second intermediate member connecting the second hinge member with the second gear.

Since the axes of rotation of the first and second hinge members are not the same as the axes of rotation the gears, the axes of rotation of the gears may positioned such they need not bridge the distance between the axes of rotation of the hinge members but instead bridge a smaller distance. Thereby the gears may be smaller and the thickness of the hinge frame may be smaller than the thickness of the sections connected to the hinge.

The first and second hinge members may each be provided with a first guide member extending transversely to the first and second axis of rotation, respectively, the first and second intermediate members may on a first side each be provided with a second guide member extending transversely to the first and second axis of rotation and on a second side each be provided with a third guide member extending transversely to the first and second axis of rotation and transversely to the second guide member, and the gears may each be non-rotatably connected to a fourth guide member extending transversely to the third and fourth axis of rotation, respectively, whereby the two first guide members each engage a second guide member and the two third guide members each engage a fourth guide member.

With this design the intermediate members will slide along the first and fourth guide members depending on the orientation of the hinge members and still be able to transmit the rotation from the hinge members to the gears with an offset of the axes of rotation of the hinge members and the axes of rotation of the gears.

In accordance with another aspect of the invention a mobile communications device is provided. The mobile communications device comprises a housing; a transceiver in the housing; a keypad connected to the housing; and a display connected to the housing; wherein the housing comprises a first section movably connected to a second section of the housing by a multi-axis hinge comprising a hinge frame, wherein a first axis of rotation of the hinge is provided at the first section of the housing and a second offset axis of rotation of the hinge is provided at the second section of the housing, and wherein the hinge comprises means for synchronizing rotation of the first and second sections relative to the hinge through a path of about 360 degrees, wherein the hinge further comprises a locking mechanism for locking the position of the second element relative to the first element comprising a first locking member being non-rotatably connected to the first hinge member and provided with one or more indentations or protuberances positioned at predetermined angular positions in relation to the first axis of rotation, a second locking member being non-rotatably connected to the second hinge member and provided with one or more indentations or protuberances positioned at predetermined angular positions in relation to the second axis of rotation, and a third locking member being non-rotatably connected to the hinge frame and on one hand provided with one or more protuberances or indentations positioned at predetermined angular positions in relation to the first axis of rotation and on the other hand provided with one or more protuberances or indentations positioned at predetermined angular positions in relation to the second axis of rotation, wherein the third locking member is biased against the first and second locking members.

When the user of the mobile communications device being provided with the synchronized hinge moves the two elements towards or away from each other the synchronizing members will force the rotation of the first element in relation to the hinge to be synchronized with the rotation of the second element in relation to the hinge. It is contemplated that in most embodiments the desired synchronization will force the two elements to rotate the same amount but in opposite directions in relation to the hinge. The result is that the relative rotation between the two elements connected to the hinge is divided into two equal rotations; one half being the rotation of the first element relative to the hinge and the second half being the rotation of the second element relative to the hinge. Thus when a user opens the two elements of the mobile communications device, each of the two elements will experience a rotation in relation to the hinge being half the rotation experienced between the two elements.

Due to the synchronized movements of the first and second elements, the two elements will fold and unfold smoothly without the risk of jamming the hinge, i.e. the case where one element unfolds in relation to the hinge while the second element remains immovable relative to the hinge. The second element of the hinge is adapted to rotate about 360 degrees relative to the first element of the hinge. Since the hinge comprises a locking mechanism for locking the position of the second section relative to the first section a user may unfold the device to specific, predetermined positions for e.g. viewing a screen on the device or when answering the phone using the phone in elongated position where the first and second sections are essentially in line with each other.

Since the locking mechanism comprises a first locking member being non-rotatably connected to the first hinge member and provided with one or more indentations or protuberances positioned at predetermined angular positions in relation to the first axis of rotation, a second locking member being non-rotatably connected to the second hinge member and provided with one or more indentations or protuberances positioned at predetermined angular positions in relation to the second axis of rotation, and a third locking member being non-rotatably connected to the hinge frame and on one hand provided with one or more protuberances or indentations positioned at predetermined angular positions in relation to the first axis of rotation and on the other hand provided with one or more protuberances or indentations positioned at predetermined angular positions in relation to the second axis of rotation, wherein the third locking member is biased against the first and second locking members, a locking mechanism providing great stability is achieved. The user will experience that the sections will have a distinct locking functionality in relation both to each other and in relation to the hinge frame. With this design the user will experience a number of distinct positions where the hinge will be experienced as a fixed and stable unit. By introducing a number of indentations or protuberances at different angular positions it is possible to for the hinge to be locked into a number of different positions.

Preferably the locking positions provided by the indentations and protuberances about the first axis of rotation coincides with the locking positions provided by the indentations and protuberances about the second axis of rotation. However, the basic design allows that the locking positions of the first and second locking member differ, which may suitable to use when the mobile communications device is to be provided with a plurality of locking positions. Each of the first and second locking members may then provide every second locking position.

It has been found that the disclosed locking mechanism is space-saving which gives the designer the possibility to make the hinge thin and to provide the hinge with additional devices, such as a joystick, a camera, etc or to make the hinge house parts of the electrical circuitry of the mobile communications device.

The hinge body may be adapted to maintain a fixed offset distance between the first and second axes of rotation.

The hinge of the mobile communications device may have a thickness smaller than the thickness of the first and second section. With a hinge having a thickness smaller than the first and second section the hinge will be within the outer perimeter of the sections. This way the user will not experience that the hinge is inconveniently large. A hinge will e.g. be considered inconveniently large if it interferes with flat-laying of an electronic device on a table, or if it extends past the outer perimeter of an electronic device being closed for storage in a pocket or the like. It will also be considered inconveniently large if it get entangled with straps for other electronic devices, the headset of the mobile communications device or a string of a hood or the like on a jacket. The design disclosed in more detail below make it possible to form a hinge with a thickness (in a direction being perpendicular both to a line extending between the first and second axis of rotation and to the first and second axis of rotation) being smaller than the distance between the first and the second axis of rotation. The design disclosed in more detail below also makes it possible to form a hinge having a thickness (in a direction along the distance between the first and second axis of rotation) being smaller than twice the distance between the first and second axis of rotation. Dependent upon the kind of electronic device different aspects of being thin may be contemplated.

The first and second sections of the mobile communications device may be adapted to take a first position with the keypad and display being closed by the first and second sections, a second position with the second section rotated about 180 degrees, preferably 160 degrees, relative to the first section such that the first section is substantially inline, preferably slightly out of inline, with the second section and a hinge frame of the hinge, and a third position with the second section rotated about 360 degrees relative to the first section and having the keypad and display located on opposite exterior facing sides of the mobile communications device. With this design it is possible to provide the mobile communications device with dedicated functionality relating to the different positions.

The hinge body may be adapted to maintain a fixed offset distance between the first and second axes of rotation.

The hinge may comprise a hinge frame having a general oval side profile and two parallel pin receiving holes. The thickness of the hinge may hence be reduced providing a slender but still durable hinge. As briefly mentioned above a slender design will minimize the risk that the mobile communications device get stuck in the pocket or get entangled with straps for other electronic devices, the headset of the mobile communications device or a string of a hood or the like on a jacket.

It is also contemplated that the hinge may comprise a hinge frame having a generally rectangular shape. This may e.g. be convenient when it is desired to provide a mobile communications device with stable stand up properties.

The locking mechanism may be adapted to lock the position of the second section relative to the first section at an intermediate position between a fully closed position and a 360 degree fully open position. A user of a device equipped with a hinge according to the present invention may hence unfold the device to specific, predetermined positions for e.g. viewing a screen on the device.

In accordance with an aspect of the inventive mobile communications device it further comprises a flex circuit extending across the hinge and electrically connecting electronic circuitry in the first section to electronic circuitry in the second section. With this flex circuit it is possible to electrically connect the electronic circuitry in the first section to electronic circuitry in the second section and still allowing the two sections to be folded about each other in a complete path of 360° in relation to each other.

The flex circuit may be partly wound about the first axis of rotation in a first direction and about the second axis of rotation also in the first direction. With this design the flex circuit will act as a belt being wound about the first and second axis of rotation such that it will be fully or partly transferred from one of the axis of rotation to the other as the hinge members are rotated.

The flex circuit may be wound about the first and second axis of rotation in a total winding angle of at least 180°. With this design there will always be enough circuit to allow a total mutual rotation of 360° of the hinge members and the axes of rotation. When the first axis rotates 180° and wound off 180° flex circuit, the second axis will rotate 180° and wound up the corresponding amount of flex circuit, thus allowing a total of 360° mutual rotation of the hinge members.

The third locking member may be movable along the first and second axis of rotation thereby allowing said indentations and protuberances of the third locking member to engage and disengage said indentations and protuberances of the first and second locking members. This way a distinct locking functionality is achieved. Moreover, the design make it possible to use the inside of the hinge frame or the axes of rotation to give a stable guiding of the third locking member. Moreover, the moveability makes it easy to provide the biasing simply by providing a pressure spring, such as a coiled spring, between the third locking member and a shoulder or wall of the hinge frame.

The third locking member may comprise a body formed with two through-going holes and wherein two shafts, extending along the first and second axis of rotation, respectively, extends through said through-going holes. This makes it possible to use the axis of rotation as guides when the third locking member is displaced for accomplishing the engagement and disengagement.

Each of the first and the second locking members may comprise a disc non-rotatably attached to the hinge member as a wheel about the respective axis of rotation and provided with indentation on a side surface. This way it is easily accomplished locking positions through-out the maximum rotation of the first and second hinge members. Moreover, the increased radius will give an increased torque resistance of the locking mechanism.

In accordance with an aspect of the inventive mobile communications device the synchronizing members comprises a first gear rotatable with first section about an third axis of rotation offset the first axis of rotation, a second gear rotatable with the second section about a fourth axis of rotation offset the second axis of rotation and in engagement with the first gear, and a first intermediate member connecting the first section with the first gear and a second intermediate member connecting the second section with the second gear.

Since the axes of rotation of the first and second sections are not the same as the axes of rotation the gears, the axes of rotation of the gears may positioned such they need not bridge the distance between the axes of rotation of the hinge members but instead bridge a smaller distance. Thereby the gears may be smaller and the thickness of the hinge frame may be smaller than the thickness of the sections connected to the hinge.

It has been found that the disclosed synchronisation mechanism is space-saving which, as mentioned above in relation to the space-saving of the locking mechanism, gives the designer the possibility to make the hinge thin and to provide the hinge with additional devices, such as a joystick, a camera, etc or to make the hinge house parts of the electrical circuitry of the mobile communications device.

The first and second sections may each be provided with a first guide member extending transversely to the first and second axis of rotation, respectively, the first and second intermediate members may on a first side each be provided with a second guide member extending transversely to the first and second axis of rotation and on a second side each be provided with a third guide member extending transversely to the first and second axis of rotation and transversely to the second guide member, and the gears may each be non-rotatably connected to a fourth guide member extending transversely to the third and fourth axis of rotation, respectively, whereby the two first guide members each engage a second guide member and the two third guide members each engage a fourth guide member.

With this design the intermediate members will slide along the first and fourth guide members depending on the orientation of the sections and still be able to transmit the rotation from the hinge members to the gears with an offset of the axes of rotation of the hinge members and the axes of rotation of the gears.

BRIEF DESCRIPTION OF THE DRAWINGS

The invention will be described in more detail with reference to the appended schematic drawings, which shows examples of presently preferred embodiments of the invention.

DETAILED DESCRIPTION OF PREFERRED EMBODIMENTS

Figure 1:
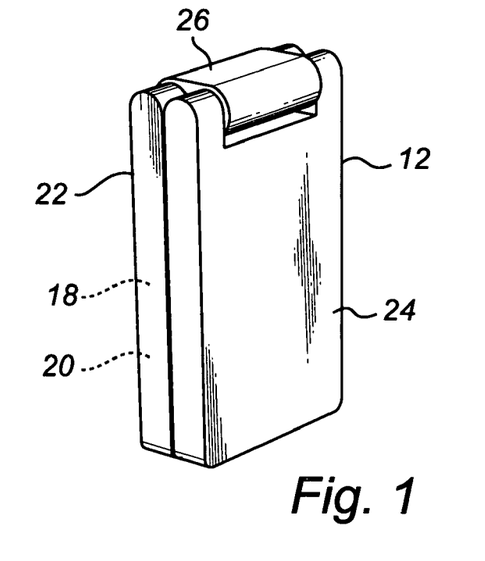
FIG. 1 is a perspective view of a mobile communications device in a first closed position incorporating features of the present invention.

Referring to FIG. 1, there is shown a perspective view of an mobile communications device 10 incorporating features of the present invention. Although the present invention will be described with reference to the exemplary embodiments shown in the drawings, it should be understood that the present invention can be embodied in many alternative forms of embodiments. In addition, any suitable size, shape or type of elements or materials could be used.

In the embodiment shown, the mobile communications device 10 generally comprises a mobile communicator, such as a mobile telephone. In alternative embodiments, the mobile communications device could comprise any suitable type of mobile communicator, such as a device which comprises a pager function or a text transmission function.

Figure 2:
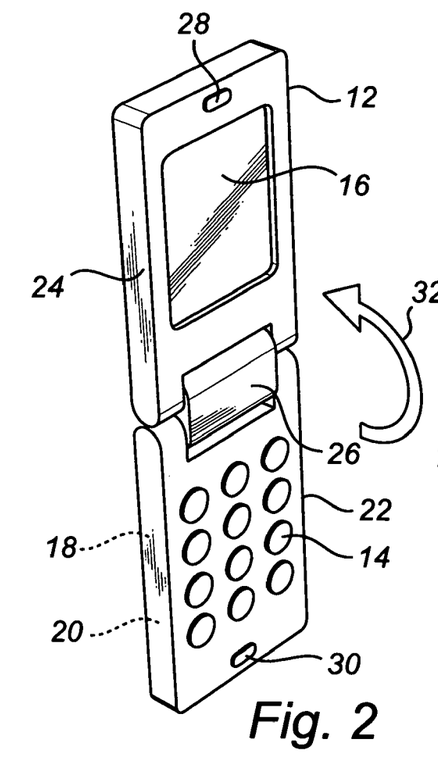
FIG. 2 is a perspective view of the mobile communications device shown in FIG. 1 with housing components moved to an intermediate flipped open position.

Referring also to FIG. 2, the mobile communications device 10, in the embodiment shown, generally comprises a housing 12, a keypad 14, a display 16, a transceiver 18, a battery 20 and other components conventional to a mobile telephone, such as a microprocessor and an antenna. The housing 12 generally comprises a first section 22, a second section 24, and a connection or hinge 26 which movably connects the second section 24 to the first section 22. In the embodiment shown, the keypad 14 is connected to the first section 22 of the housing. The display 16 is connected to the second section 24 of the housing. In alternative embodiments, the various mobile communications components of the telephone 10 could be located in any one of the housing sections.

Figure 3:
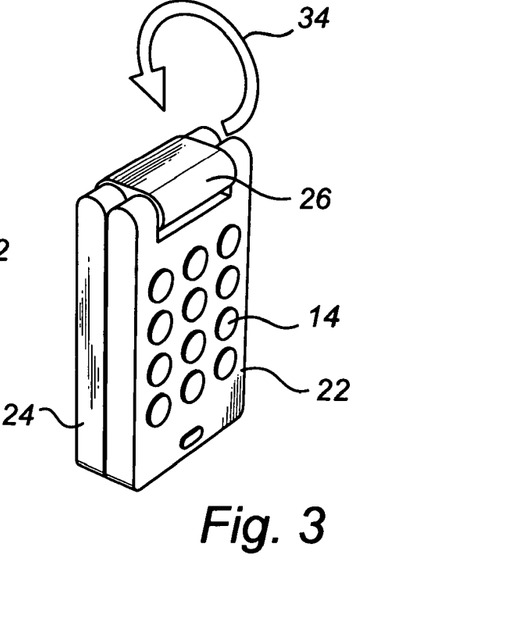
FIG. 3 is a perspective view of the mobile communications device shown in FIG. 1 with housing components moved to a 360 degree fully flipped open and folded position.

Referring particularly to FIGS. 1-3, the housing 12 is movable into at least three different configurations. FIG. 1 shows the housing 12 in a closed, folded first configuration. In this closed, folded first configuration the first and second sections 22, 24 are located adjacent each other with the display 16 and keypad 14 facing each other. This provides a compact folded configuration wherein the keypad 14 and display 16 are not readily accessible to the user. In an alternative embodiment, the first section 22 could comprise the display 16.

FIG. 2 shows the housing 12 in the first open position. More specifically, the hinge 26 allows the second section 24 of the housing to be flipped open about 180 degrees relative to the first section 22 of the housing as indicated by arrow 32. In the embodiment shown, the second section 24 is substantially aligned with the first section 22 and the connection 26. However, in alternative embodiments, the first open position could comprise the second section 24 being located at an angle of less than 180 degrees, such as about 160 degrees for example. This first open position allows the user to locate a speaker or sound transducer 28 at the user's ear and a microphone 30 proximate the user's mouth.

FIG. 3 shows the housing 12 in a second open position. More specifically, the hinge 26 allows the second section 24 of the housing to be folded over about another 180 degrees relative to the first section 22 of the housing as indicated by arrow 34. In this fully open 360 degree flipped position, the first and second sections 22, 24 are collapsed against each other in the open folded position shown, but in a reverse orientation relative to the closed, folded position shown in FIG. 1. In this second open position, the keypad 14 is located at the exterior facing side of the first section 22 and the display 16 is located at the opposite exterior facing side of the second section 24. In the folded fully open position shown in FIG. 3 a user can use the mobile communications device 10 in a collapsed, folded configuration, for example such as when the mobile communications device comprises a feature which could comprise use of keys on the second section 24, or when the display 16 comprises a touch screen display.

Figure 4A:
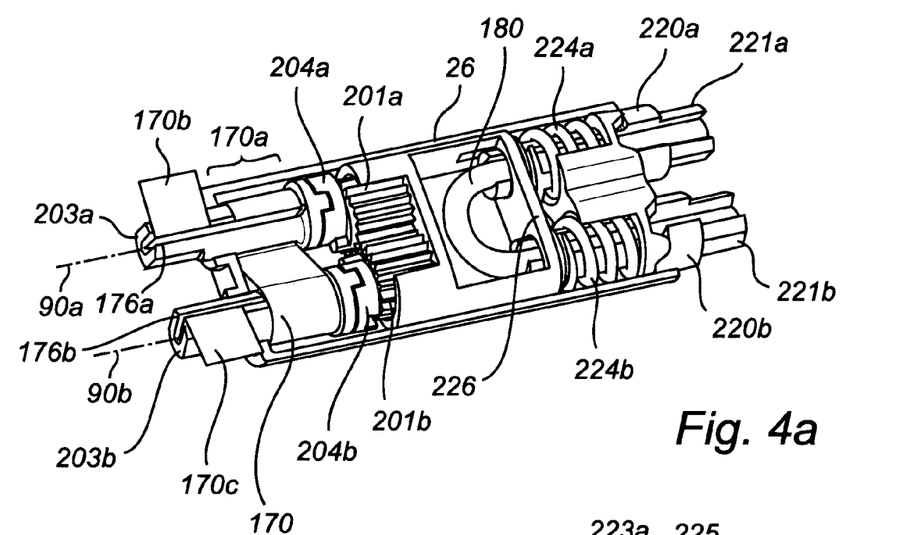
FIG. 4*a* is a perspective view of a hinge for the mobile communications device shown in FIG. 1 according to a preferred embodiment of the present invention.

Referring to FIG. 4a, an outlined perspective view of a preferred embodiment of the hinge 26 of the mobile communications device 10 is shown. The hinge generally comprises a hinge frame 26 housing synchronisation means, locking means and electric wiring electrically connecting the two sections of the device. The hinge frame 26 has a generally oval side profile.

The synchronizing mechanism of FIGS. 4-11 comprises a first gear 201a and a second gear 201b in engagement with each other.

A detailed functionality description of the synchronisation means will be based on FIGS. 6-11. In these figures the locking mechanism and electrical circuitry has been left out for clarity reasons. The same reference numerals as used in FIGS. 6-11 will be used in FIGS. 4a-c although the actual design is different. It may especially be noted that the shafts denoted 203a and 203 include the electric circuitry 170 whereas the shafts in the schematic FIGS. 6-11 has been simplified in the drawings such that they comprise no electric circuitry.

Figure 6:
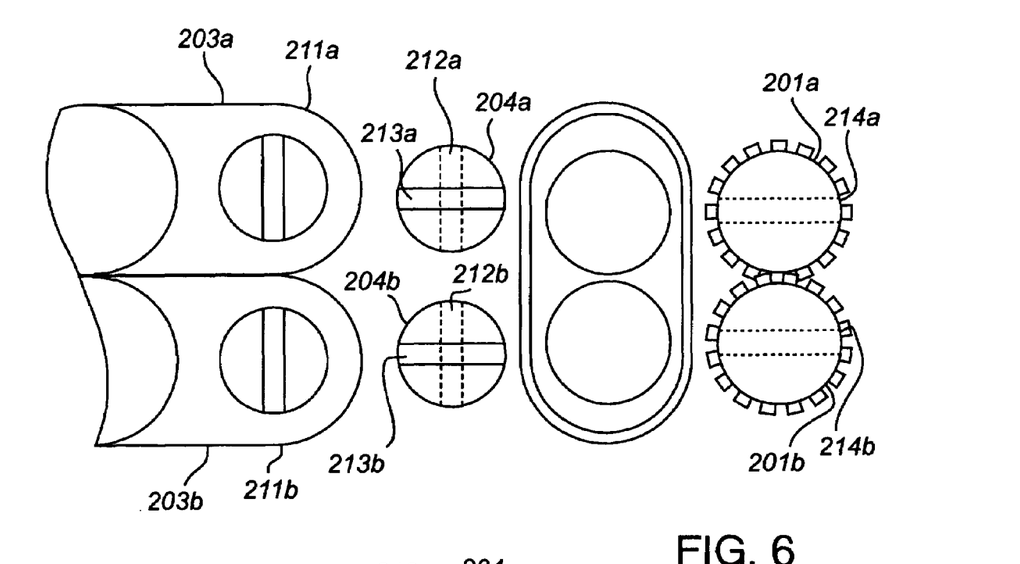
FIG. 6 is an exploded plan view of the synchronizing mechanism showing the synchronizing members in plane view.
Figure 7:
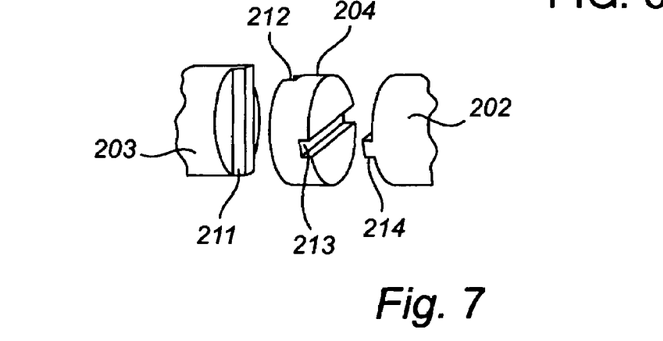
FIG. 7 is an exploded view showing part of the synchronizing members in perspective.
Figure 8:
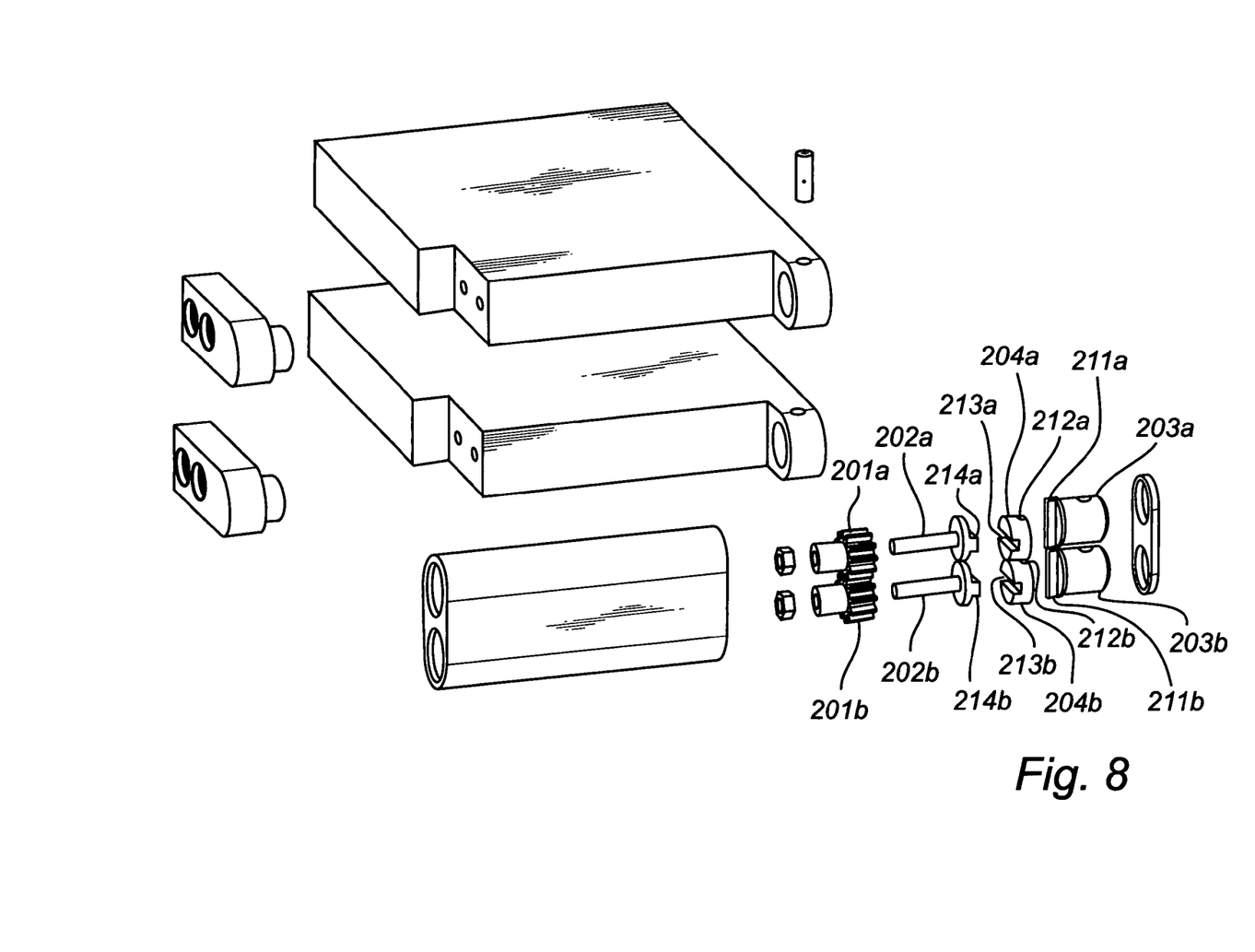
FIG. 8 is an exploded view showing a complete mobile communications device with a synchronizing mechanism in accordance with FIGS. 6-7.

The first gear 201a is non-rotatably connected to a first gear shaft 202a and the second gear 201b is non-rotatably connected to a second gear shaft 202b.

The first section of the mobile communications device is non-rotatably connected to a first shaft 203a and a second section is non-rotatably connected to a second shaft 203b. The shafts 203a, 203b are offset the first and second gear shafts 202a, 202b. The distance between the first and second shafts 203a, 203b is determined by the thickness of the sections of the mobile communications device. The distance between the first and second gear shafts 202a, 202b is determined by the first and second gear 201a, 201b.

A pair of intermediate members 204a, 204b are positioned between said shafts 203a, 203b and said gear shafts 202a, 200b.

The shafts 203a, 203b are each provided with a rib 211a, 211b on the surface facing the intermediate members 204a, 204b. The ribs 211a, 211b extends transversely to the axes of rotation and extends radially in both directions from the centre axis.

The intermediate members 204a, 204b are on a surface facing the first and second shafts 203a, 203b each provided with a groove 212a, 212b adapted to receive the ribs 211a, 211b of the shafts 203a, 203b. The grooves 212a, 212b extend transversely to the axes of rotation of the shafts 203a, 203b and extends radially in both directions from the centre axis of the intermediate members 204a, 204b.

The intermediate members 204a, 204b are each further, on a surface facing the gears 201a, 201b, provided with a groove 213a, 213b extending transversely to the axes of rotation of the shafts 203a, 203b and transversely to the grooves 212a, 212b on the other side of the intermediate members 204a, 204b. The grooves 213a, 213b also extends radially in both directions from the centre axis of the intermediate members 204a, 204b.

The gear shafts 202a, 202b are each provided with a rib 214a, 214b on the surface facing the intermediate members 204a, 204b. The ribs 214a, 214b extends transversely to the gear shafts and extends radially in both directions from the centre axis. The ribs 214a, 214b are received in the grooves 213a, 213b of the intermediate members 204a, 204b.

As shown in FIGS. 4, 6-11, the ribs and grooves will slide in relation to each other and the intermediate members 204a, 204b will be translated back and forth in relation to the shafts and gear shafts. The ribs and grooves forms guide members. At certain angular positions of the shafts and gear shafts the intermediate members will be aligned with the shafts and at other angular positions they will be aligned with the gear shafts. In the end positions one set of rib and groove on one side of the intermediate member will be oriented transversely to the offset distance and the other set of rib and groove will be oriented along the offset distance. The set of rib and groove being transverse to the offset distance will not allow any offset distance between the axis of rotation of the shaft and the axis of rotation of the intermediate member, whereas the set of rib and groove being oriented along the offset distance will allow the necessary offset distance by a relative displacement of the groove of the intermediate member and the rib of the gear shaft. When rotated 90°, the rib and groove-engagement of the intermediate member and gear shaft will not allow any offset distance, whereas the rib and groove-engagement between the intermediate member and the shafts will be directed along the offset distance and allow the necessary displacement of the intermediate member in relation to the axes of rotation of the shafts.

Figure 9:
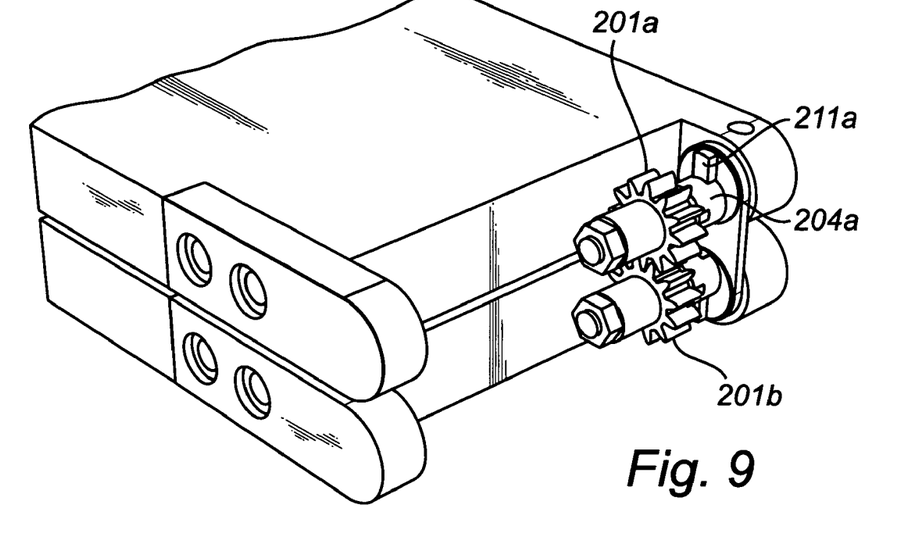
FIGS. 9-11 show three different positions of the device in FIG. 8.
Figure 10:
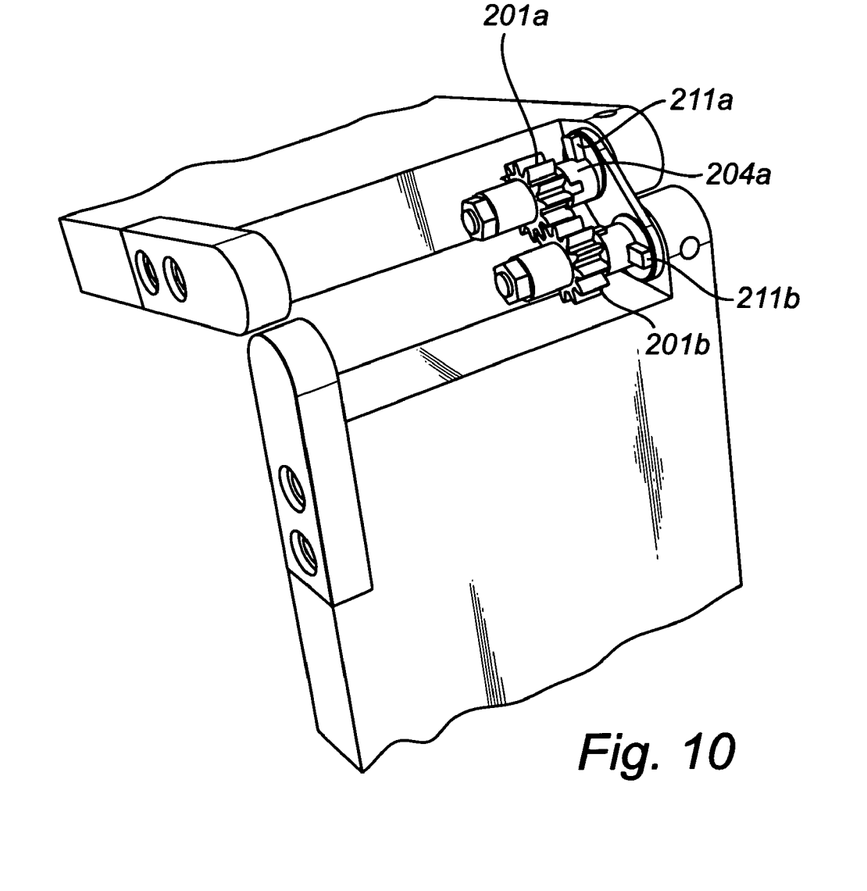
Figure 11:
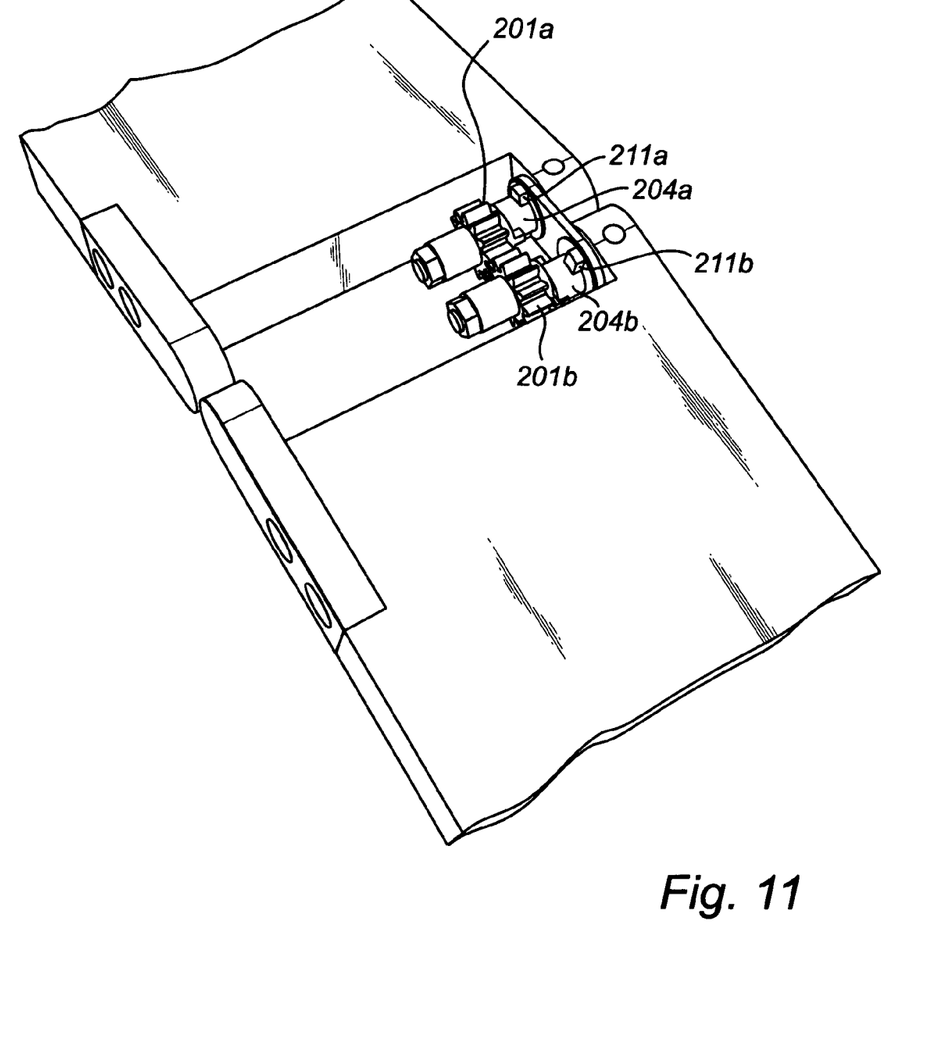

In FIGS. 9-11 it is shown how the intermediate members 204a, 204b move from one end position on the ribs 211a, 211b towards a centre position (when the sections are completely flat laid as almost reached in FIG. 11). Note how the free portion of the ribs 211a, 211b becomes shorter and shorter in FIGS. 10-11 compared to in FIG. 9.

The choice of providing the shafts with ribs and the intermediate members with grooves may interchanged such that the intermediate members is formed with ribs and the shafts are formed with grooves or such that the intermediate members are formed with a groove on one side and a rib on the other side and respective shaft is provided with a corresponding rib or groove.

Figure 4B:
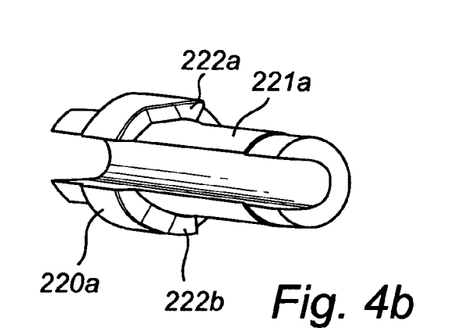
FIG. 4*b* is a perspective view of a shaft of the mobile communications device shown in FIG. 4*a*.
Figure 4C:
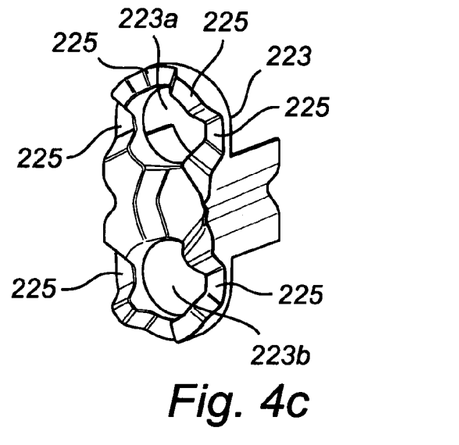
FIG. 4*c* is a perspective view of a locking member of the mobile communications device shown in FIG. 4*a*.

The locking mechanisms of FIG. 4a-c comprises two discs 220a, 220b each being integrally formed with respective shaft 221a, 221b. The shafts 221a, 221b are arranged to be rotated with respective section of the mobile communications device. The discs 220a, 220b may be non-rotatably connected to respective shaft 221a, 221b.

The discs 220a, 220b are provided with a number of protuberances 222a-b positioned on the side surfaces of the discs 220a, 220b and at different angular positions.

The locking mechanism further comprises a third locking member 223 formed of a plate with two through-going holes 223a, 223b. The plate 223 is provided with indentations 225. As shown in FIG. 4c, the indentations 225 are formed symmetrically such that an indentation 225 located at a certain angular position about the first through-going hole 223a has a corresponding indentation 225 at the corresponding mirrored angular position about the second through-going hole 223b. Thereby both sections 22, 24 of the mobile communications device will be locked simultaneously by the locking mechanism.

The shafts 221a, 221b extend through the holes 223a, 223b thereby accomplishing a relative guiding action between the shafts 221a, 221b and the third locking member 223.

The third locking member 223 is biased against the discs 221a, 221b by two coiled springs 224a, 224b resting against a wall 226 inside the hinge frame 26.

When the user rotates one of the sections 22 of the mobile communications device relative to the hinge 26, the other section 24 will due to a synchronizing mechanism also be rotated to the same extent but in the opposite direction in relation to the hinge 26. The protuberances 222 of the discs 221a, 221b will thereby be displaced (by rotation of the discs) out of register with the indentations 225 of the third locking member 223. The sloping surfaces of the indentations 225 and protuberances 222 will wedgingly force the third locking member 223 towards the wall 26 against the biasing force of the two springs 224a, 224b, such that the discs 221a, 221b can be turned. When the user continues to rotate the sections 22, 24 in relation to the hinge 26, another set of indentations 225 will at a certain angular position start to receive the protuberances 222a, 22b of respective shaft 221a, 221b. Due to the sloped sides of the protuberances 222a, 222b and the indentations 225 and the biasing achieved by the elastic deformation of the springs 224a, 224b, the engagement will by itself be forced to a locked position.

The mobile communications device is provided with an electric wiring electrically connecting the two sections of the device. An embodiment of this electric wiring is shown in principle in FIG. 4 and in slightly more detail in FIG. 5.

Figure 5:
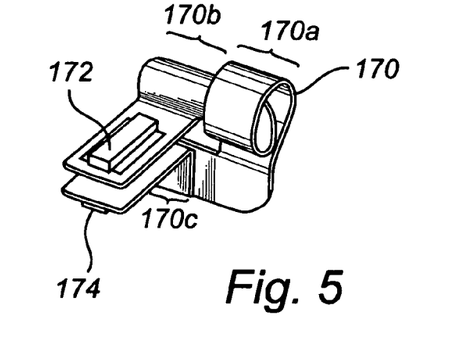
FIG. 5 is a perspective view of the flex circuit in FIG. 4 provided with conventional electrical connections.

The electric wiring is formed by a flex circuit 170 extending across the hinge and electrically connecting electronic circuitry in the first section to electronic circuitry in the second section. The electronic circuitry in the first and second sections are connected to the flex circuit using suitable conventional connections 172, 174.

The flex circuit 170 wound about the first axis of rotation 90a in a first direction and about the second axis of rotation 90b also in the first direction. The flex circuit 170 is wound about the first and second axis of rotation 90a and 90b in a total winding angle of at least 180°. Thereby there will always be enough circuit to allow a total mutual rotation of 360° of the hinge members and the axes of rotation. When the first axis rotates 180° and wounds off 180° of the flex circuit, the second axis will rotate 180° and wound up the corresponding amount of the flex circuit, thus allowing a total of 360° mutual rotation of the hinge members.

The flex circuit 170 is provided with a winding portion 170a in which the flex circuit 170 displays the above described windings. The ends of the winding portion 170a of the flex circuit 170 enters into longitudinal slots 176a, 176b in the shafts 90a, 90b extending along the first and second axis of rotation, respectively. The longitudinal slots 176a, 176b extend radially into the shafts 90a, 90b. The flex circuit 170 is further provided with two connector portions 170b, 170c extending longitudinally, i.e. along the winding axes, from the ends of the winding portion 170a. The connector portions 170b, 170c extend outside the winding portion 170a to allow the above mentioned connections 172, 174 to be connected to the flex circuit 170 outside the winding portion 170a, such that they will not interfere with the winding function of the flex circuit 170.

The mobile communications device is further provided with a U-shaped micro coaxial cable 180, which may be used to transfer signals or power between the sections or between a section and electronic components in the hinge frame. It may e.g. be noted that a camera or other extra devices in the hinge frame needs to be electrically connected to one or both of the sections, e.g. by using the micro coaxial cable.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hinge comprising:
   a hinge frame,
   a first hinge member defining a first axis of rotation with a first element connected to the hinge frame,
   a second hinge member defining an offset second axis of rotation with a second element connected to the hinge frame, and
   synchronizing members which transfer rotational movement of the first element relative to the hinge frame to rotational movement of the second element relative to the hinge frame through a path of about 360 degrees of rotational movement of the first element in relation to the second element,
   wherein the hinge further comprises a locking mechanism for locking the position of the second element relative to the first element comprising
   a first locking member being non-rotatably connected to the first hinge member and provided with one or more indentations or protuberances positioned at predetermined angular positions in relation to the first axis of rotation,
   a second locking member being non-rotatably connected to the second hinge member and provided with one or more indentations or protuberances positioned at predetermined angular positions in relation to the second axis of rotation,
   and a third locking member being non-rotatably connected to the hinge frame and on one hand provided with one or more protuberances or indentations positioned at predetermined angular positions in relation to the first axis of rotation and on the other hand provided with one or more protuberances or indentations positioned at predetermined angular positions in relation to the second axis of rotation,
   wherein the third locking member is biased against the first and second locking members.

2. A hinge as in claim 1, wherein the hinge is arranged in an mobile communications device comprising a first and a second section, wherein the first section of the mobile communications device comprises the first element of the hinge and the second section of the mobile communications device comprises the second element of the hinge.

3. A hinge as in claim 2, wherein the hinge has a thickness smaller than the thickness of the first and second section.

4. A hinge as in claim 1, wherein the first and second elements are frame members rigidly attached or attachable to a first and second section of a mobile communications device.

5. A hinge as in claim 4, wherein the hinge has a thickness smaller than the thickness of the first and second section.

6. A hinge as in claim 1, wherein the hinge frame has a generally oval side profile and two parallel pin receiving holes.

7. A hinge as in claim 1, wherein the hinge frame is adapted to receive and substantially enclose the synchronizing and locking members.

8. A hinge as in claim 1, wherein the locking mechanism is adapted to lock the position of the second element relative to the first element at an intermediate position between a fully closed position and a 360 degree fully open position.

9. A hinge as in claim 1, further comprising a flex circuit extending across the hinge being adapted to electrically connecting electronic circuitry in a first section attached to the first hinge member to electronic circuitry in a second section attached to the second hinge member.

10. A hinge as in claim 9, wherein flex circuit partly wound about the first axis of rotation in a first direction and about the second axis of rotation also in the first direction.

11. A hinge as in claim 10, wherein the flex circuit is wound about the first and second axis of rotation in a total winding angle of at least 180°.

12. A hinge as in claim 1, wherein the third locking member is movable along the first and second axis of rotation thereby allowing said indentations and protuberances of the third locking member to engage and disengage said indentations and protuberances of the first and second locking members.

13. A hinge as in claim 1, wherein the third locking member comprises a body formed with two through-going holes and wherein two shafts, extending along the first and second axis of rotation, respectively, extends through said through-going holes.

14. A hinge as in claim 1, wherein each of the first and the second locking members comprise a disc non-rotatably attached to the hinge member as a wheel about the respective axis of rotation and provided with indentation on a side surface.

15. A hinge as in claim 1, wherein the synchronizing members comprises a first gear rotatable with first hinge member about an third axis of rotation offset the first axis of rotation, a second gear rotatable with the second hinge member about a fourth axis of rotation offset the second axis of rotation and in engagement with the first gear, and a first intermediate member connecting the first hinge member with the first gear and a second intermediate member connecting the second hinge member with the second gear.

16. A hinge as in claim 15, wherein the first and second hinge members are each provided with a first guide member extending transversely to the first and second axis of rotation, respectively,
the first and second intermediate members are on a first side each provided with a second guide member extending transversely to the first and second axis of rotation and on a second side each provided with a third guide member extending transversely to the first and second axis of rotation and transversely to the second guide member, and
the gears are each non-rotatably connected to a fourth guide member extending transversely to the third and fourth axis of rotation, respectively,
whereby the two first guide members each engage a second guide member and the two third guide members each engage a fourth guide member.

17. A mobile communications device comprising:
a housing;
a transceiver in the housing;
a keypad connected to the housing; and
a display connected to the housing;
wherein the housing comprises a first section movably connected to a second section of the housing by a multi-axis hinge comprising a hinge frame, wherein a first axis of rotation of the hinge is provided at the first section of the housing and a second offset axis of rotation of the hinge is provided at the second section of the housing, and wherein the hinge comprises means for synchronizing rotation of the first and second sections relative to the hinge through a path of about 360 degrees,
wherein the hinge further comprises a locking mechanism for locking the position of the second element relative to the first element comprising a first locking member being non-rotatably connected to the first hinge member and provided with one or more indentations or protuberances positioned at predetermined angular positions in relation to the first axis of rotation,
a second locking member being non-rotatably connected to the second hinge member and provided with one or more indentations or protuberances positioned at predetermined angular positions in relation to the second axis of rotation,
and a third locking member being non-rotatably connected to the hinge frame and on one hand provided with one or more protuberances or indentations positioned at predetermined angular positions in relation to the first axis of rotation and on the other hand provided with one or more protuberances or indentations positioned at predetermined angular positions in relation to the second axis of rotation,
wherein the third locking member is biased against the first and second locking members.

18. A mobile communications device as in claim 17, wherein the hinge has a thickness smaller than the thickness of the first and second section.

19. A mobile communications device as in claim 17, wherein the first and second sections are adapted to take a first position with the keypad and display being closed by the first and second sections, a second position with the second section rotated about 180 degrees, preferably 160 degrees, relative to the first section such that the first section is substantially inline, preferably slightly out of inline, with the second section and a hinge frame of the hinge, and a third position with the second section rotated about 360 degrees relative to the first section and having the keypad and display located on opposite exterior facing sides of the mobile communications device.

20. A mobile communications device as in claim 17, wherein the hinge frame has a generally oval side profile and two parallel pin receiving holes.

21. A mobile communications device as in claim 17, wherein the locking mechanism is adapted to lock the position of the second section relative to the first section at an intermediate position between a fully closed position and a 360 degree fully open position.

22. A mobile communications device as in claim 17, further comprising a flex circuit extending across the hinge and electrically connecting electronic circuitry in the first section to electronic circuitry in the second section.

23. A mobile communications device as in claim 22, wherein flex circuit partly wound about the first axis of rotation in a first direction and about the second axis of rotation also in the first direction.

24. A mobile communications device as in claim 23, wherein the flex circuit is wound about the first and second axis of rotation in a total winding angle of at least 180°.

25. A mobile communications device as in claim 17, wherein the third locking member is movable along the first and second axis of rotation thereby allowing said indentations and protuberances of the third locking member to engage and disengage said indentations and protuberances of the first and second locking members.

26. A mobile communications device as in claim 17, wherein the third locking member comprises a body formed with two through-going holes and wherein two shafts, extending along the first and second axis of rotation, respectively, extends through said through-going holes.

27. A mobile communications device as in claim 17, wherein each of the first and the second locking members comprise a disc non-rotatably attached to the hinge member as a wheel about the respective axis of rotation and provided with indentation on a side surface.

28. A mobile communications device as in claim 17, wherein the synchronizing members comprises a first gear rotatable with first section about an third axis of rotation offset the first axis of rotation, a second gear rotatable with the second section about a fourth axis of rotation offset the second axis of rotation and in engagement with the first gear, and a first intermediate member connecting the first section with the first gear and a second intermediate member connecting the second section with the second gear.

29. A mobile communications device as in claim 28, wherein the first and second sections are each provided with a first guide member extending transversely to the first and second axis of rotation, respectively, the first and second intermediate members are on a first side each provided with a second guide member extending transversely to the first and second axis of rotation and on a second side each provided with a third guide member extending transversely to the first and second axis of rotation and transversely to the second guide member, and the gears are each non-rotatably connected to a fourth guide member extending transversely to the third and fourth axis of rotation, respectively, whereby the two first guide members each engage a second guide member and the two third guide members each engage a fourth guide member.

* * * * *